United States Patent [19]

Harms et al.

[11] Patent Number: 4,837,320
[45] Date of Patent: Jun. 6, 1989

[54] ONE-AMINE-2-SULPHO-4-[(4-HALO-6-AMINO TRIAZINYL-2)AMINOCYCLOHEX-YLAMINO]ANTHRAQUINONE REACTIVE DYESTUFFS

[75] Inventors: Wolfgang Harms; Klaus Wunderlich, both of Leverkusen; Klaus von Oertzen, Cologne, all of Fed. Rep. of Germany

[73] Assignee: Bayer Aktiengesellschaft, Leverkusen, Fed. Rep. of Germany

[21] Appl. No.: 691,992

[22] Filed: Jan. 16, 1985

Related U.S. Application Data

[63] Continuation of Ser. No. 592,686, Mar. 23, 1984, abandoned, which is a continuation of Ser. No. 418,158, Sep. 15, 1982, abandoned, which is a continuation of Ser. No. 848,295, Nov. 3, 1977, abandoned.

[30] Foreign Application Priority Data

Nov. 16, 1976 [DE] Fed. Rep. of Germany ....... 2652119

[51] Int. Cl.$^4$ ................... C09B 62/004; C09B 62/024; C09B 62/06; D06P 1/382
[52] U.S. Cl. .................................... 544/189; 260/370; 260/371; 260/508; 544/190
[58] Field of Search ................ 544/189, 190; 260/153; 534/638

[56] References Cited

U.S. PATENT DOCUMENTS 3,043,650  7/1962  Wegman et al. ............... 544/189 X
3,065,191 11/1962  Heslop et al. ....................... 260/153
3,408,345 10/1968  Birn et al. ......................... 544/189 X
3,415,825 12/1968  Bueher et al. ....................... 544/189
3,558,620  1/1971  Bien et al. ........................... 544/189
3,558,621  1/1971  Bien et al. ........................... 544/189

FOREIGN PATENT DOCUMENTS 350400  1/1961  Switzerland ....................... 544/189

Primary Examiner—Floyd D. Higel
Attorney, Agent, or Firm—Sprung Horn Kramer & Woods

[57] ABSTRACT

Dyestuffs of the formula

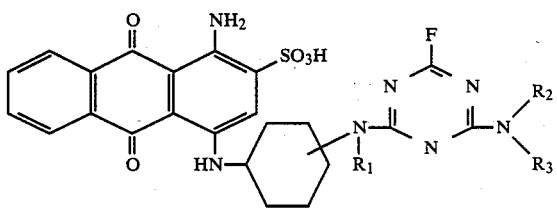

wherein $R_1$ and $R_2$ are each hydrogen or $C_1$–$C_4$-alkyl and $R_3$ is phenyl substituted with sulpho have the meaning given in the description, and their use for the dyeing and printing of textile materials containing hydroxyl groups and containing nitrogen, especially textile materials consisting of natural and regenerated cellulose, and also those consisting of wool, silk and synthetic polyamide and polyurethane fibers. Dyeings obtained distinguish themselves by good fastness properties and high brilliancy.

3 Claims, No Drawings

ONE-AMINE-2-SULPHO-4-[(4-HALO-6-AMINO TRIAZINYL-2)AMINOCYCLOHEXYLAMINO]ANTHRAQUINONE REACTIVE DYESTUFFS

This is a continuation of application Ser. No. 592,686, filed 3/23/84, abandoned, which is a continuation of Ser. No. 418,158 filed 9/15/82 (abandoned) which is a continuation of Ser. No. 848,295 filed 11/3/77 (abandoned).

The present invention relates to reactive dyestuffs of the formula

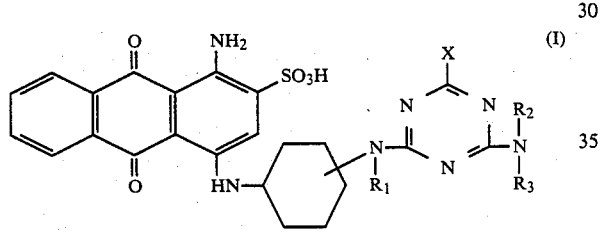

wherein
X: F, Cl or Br,
$R_1$ and $R_2$: H or optionally substituted $C_1$–$C_4$-alkyl and
$R_3$: optionally substituted phenyl or naphthyl, at least one of the radicals $R_2$ or $R_3$ containing at least one group which confers solubility in water.

Suitable radicals $R_1$ are, for example, H, —CH$_3$, —C$_2$H$_5$, —CH$_2$CH$_2$OH and —CH$_2$CH$_2$OSO$_3$H.

Suitable radicals $R_2$ are, for example, H, —CH$_3$, —C$_2$H$_5$, —CH$_2$SO$_3$H, —CH$_2$COOH, —CH$_2$CH$_2$SO$_3$H, —CH$_2$CH$_2$—CH$_2$—COOH, —CH$_2$CH$_2$OH and —CH$_2$CH$_2$OSO$_3$H.

Suitable radicals $R_3$ are, for example, phenyl, 2-, 3- or 4-sulphophenyl, 2,4-, 2,5- or 3,5-disulphophenyl, 2-, 3- or 4-carboxyphenyl, 2-carboxy-4- or -5-sulphophenyl, 3-carboxy-5-sulphophenyl, 2-methyl-4,5-disulphophenyl, 4-methyl-2- or -3-sulphophenyl, 2-methyl-4- or -5-sulphophenyl, 2,6-dimethyl-3- or -4-sulphophenyl, 2,4-dimethyl-6-sulphophenyl, 2-chloro-4- or -5-sulphophenyl, 3-chloro-2-methyl-6-sulphophenyl, 4-methoxy-2- or -3-sulphophenyl, 2-methoxy-5-sulphophenyl, 2-(β-hydroxyethoxy)-5-sulphophenyl, 4-(β-hydroxyethoxy)-2-sulpho- or -3-sulphophenyl, 4-sulphomethylphenyl, 1,5-, 2,6-, 4,8-, 5,7- or 6,8-disulpho-2-naphthyl, 2,4-, 3,7- 3,8-, 4,8-, 5,7- or 6,8-disulpho-1-naphthyl, 1,5,7- or 3,6,8-trisulpho-2-naphthyl and 3,5,7- or 3,6,8-trisulpho-1-naphthyl.

Preferred dyestuffs within the scope of the dyestuffs (I) are those of the formula

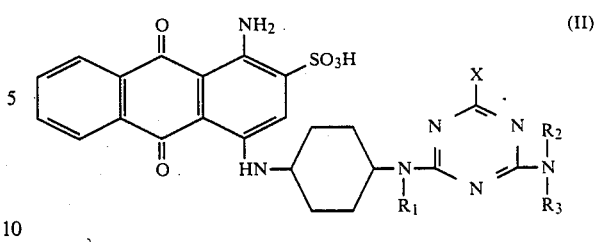

and those of the formula

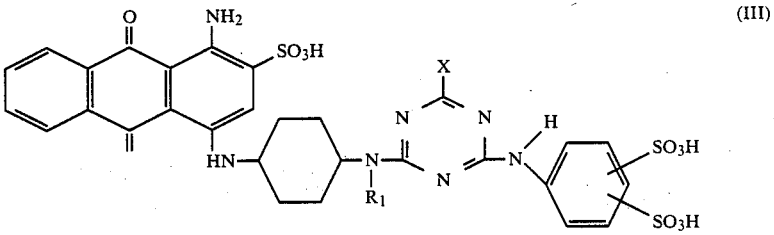

especially those of the formula II–III wherein X=F.

The new dyestuffs are obtained by subjecting aminocyclohexylamino-anthraquinone compounds of the formula

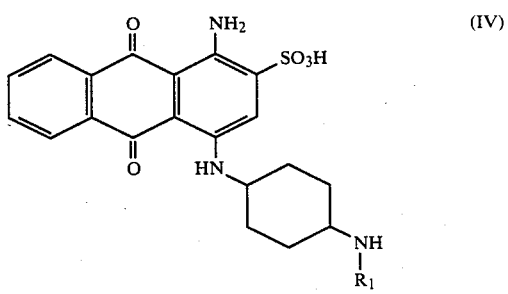

wherein $R_1$ has the meaning indicated above, to a condensation reaction with dihalogeno-triazinearylamino compounds of the formula

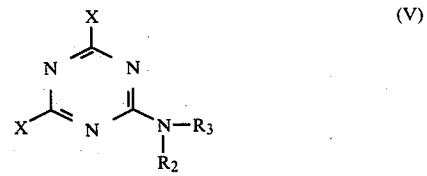

wherein $R_2$ and $R_3$ have the meaning indicated above.

Compounds of the formula V which are suitable for the condensation reaction are, for example, 2,4-difluoro-6-(2'-, 3'- or 4'-sulphophenylamino)-triazine, 2,4-difluoro-6-(2',4'-, 2',5'-, 3',4'- or 3',5'-disulphophenylamino)-triazine, 2,4-difluoro-6-(1',5'-, 2',6'-, 4',8'-, 5',7'- or 6',8'-disulpho-2'-naphthylamino)-triazine, 2,4-difluoro-6-(2',4'-, 3',7'-, 3',8'-, 4',8'-, 5',7'- or 6',8'-disulpho-1'-naphthylamino)triazine, 2,4-difluoro-6-(1',5',7'- or 3',6',8'-trisulpho-2'-naphthylamino)-triazine, 2,4-difluoro-6-(3',5',7'-trisulpho-1'-naphthylamino)-triazine, 2,4-difluoro-6-(2'-, 3'- or 4'-carboxyphenylamino)-triazine, 2,4-difluoro-6-(2'-carboxy-4'- or -5'-sulphophenylamino)-triazine, 2,4-difluoro-6-(3'-carboxy-5'-sulphophenylamino)-triazine, 2,4-difluoro-6-(2'-methyl-4'- or -5'-sulphophenylamino)-triazine, 2,4-difluoro-6-

(4'-methyl-2'- or -3'-sulphophenylamino)-triazine, 2,4-difluoro-6-(2'-methyl-4',5'-disulphophenylamino)-triazine, 2,4-difluoro-6-(2',6'-dimethyl-3'-sulpho- or -2',4'-dimethyl-6'-sulphophenylamino)-triazine, 2,4-difluoro-6-(4'-methoxy-2'-sulpho- or -4'-methoxy-3'-sulpho- or -2'-methoxy-5'-sulphophenylamino)-triazine, 2,4-difluoro-6-(2'-β-hydroxyethoxy-5'-sulpho- or 4'-β-hydroxyethoxy-2'-sulpho- or -4'-β-hydroxyethoxy-3'-sulphophenylamino)-triazine, 2,4-difluoro-6-(2'-, 3'- or 4'-sulphophenylmethylamino)-triazine, 2,4-difluoro-6-(2'-carboxy-5'-sulphophenyl-methylamino)-triazine, 2,4-difluoro-6-(3'- or 4'-sulphomethylphenylamino)-triazine, 2,4-difluoro-6-[N-(sulphomethyl)-phenylamino]-triazine, 2,4-difluoro-6-[3'-sulpho-N-(carboxymethyl)-phenylamino]-triazine and the anologous 2,4-dichloro- or 2,4-dibromo-6-arylaminotriazines.

The reaction of aminocyclohexylaminoanthraquinone compounds (IV) with the dihalogenotriazinylarylamino compounds (IV) is carried out in an aqueous or organic-aqueous medium at temperatures from −10° to 80°, preferably at 0°–50°, and at pH values of 5–10, preferably 6.0–9.0, in the presence of alkaline condensing agents, such as aqueous alkali metal hydroxide solutions, alkali metal carbonate solutions or alkali metal phosphate solutions.

The 2,4-dihalogeno-6-arylamino compounds (V) can be prepared, for example, by a condensation reaction of 2,4,6-trihalogeno-triazines with arylamines of the formula

(VI)

wherein $R_2$ and $R_3$ have the meaning indicated above, in an aqueous, aqueous-organic or organic medium in the presence of basic condensing agents, such as, for example, aqueous alkali metal hydroxide solutions, alkali metal carbonate solutions, alkali metal bicarbonate solutions or alkali metal phosphate solutions or N,N-dialkylanilines or trialkylamines.

Furthermore, the difluorotriazinylarylamino compounds (V) can be obtained by the methods indicated in German Offenlegungsschrift (German Published Specification) No. 1,644,616.

A particularly preferred and appropriate method consists in reacting the solution of the reactive components (V), obtained by the condensation reaction of 2,4,6-trihalogenotriazines with arylamines, with the aminocyclohexylaminoanthraquinone compounds (IV) directly without intermediate isolation.

According to another preparation procedure, the new reactive dyestuffs (I) are also obtained by reacting the aminocyclohexylaminoanthraquinone compounds (IV) with 2,4,6-trihalogenotriazines in an aqueous or aqueous-organic or organic medium to give intermediate products of the formula

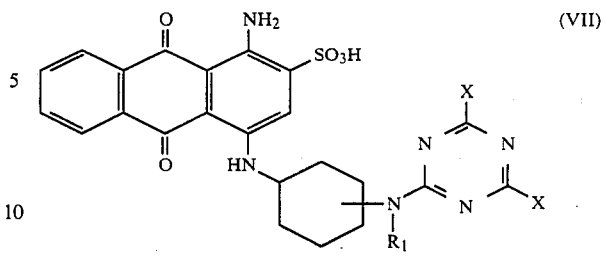
(VII)

wherein $R_1$ has the meaning indicated above, and, in a second reaction step, subjecting these reactive dyestuff intermediate products to a condensation reaction with the arylamino compounds (VI).

The new dyestuffs are extremely valuable products which are suitable for the most diverse applications. As water-soluble compounds, they are of preferred interest for dyeing textile materials containing hydroxyl groups and containing nitrogen, especially textile materials consisting of natural and regenerated cellulose, and also those consisting of wool, silk and synthetic polyamide and polyurethane fibres.

The materials mentioned are dyed or printed by the processes customary for reactive dyestuffs. Brilliant blue dyeings and prints which are fast to light and wet processing are obtained.

The temperature data in the examples are given in °C. The formulae of the dyestuffs in the description and the examples are those of the free acids. In general, the dyestuffs are isolated and used in the form of their alkali metal salts, in particular the sodium or potassium salts.

EXAMPLE 1

A. 11.4 g of 5-aminobenzene-1,3-disulphonic acid are dissolved in 150 ml of water by adding 2N sodium carbonate solution until the pH value reaches 4. 7.0 g of 2,4,6-trifluorotriazine are added dropwise at 0°–5° in the course of 5 minutes and the pH value is kept at 3.5–4.0 by adding further sodium carbonate solution. 10 minutes after the dropwise addition of the cyanuric fluoride, the condensation reaction has ended, which can be detected by the fact that the consumption of sodium carbonate ceases.

B. 13.4 g of 1-amino-4-(4'-aminocyclohexylamino)-anthraquinone-2-sulphonic acid are dissolved in 300 ml of water, by warming to 65°–70°, with the addition of 44 ml of 2N sodium hydroxide solution. The solution is cooled to 0°–5° and the colouring matter is precipitated as a fine-particled suspension by lowering the pH value to 8.5 with 6.5 ml of concentrated hydrochloric acid. The solution of the condensation product A is now allowed to run in in the course of about 15 minutes and the pH value of the reaction mixture is kept at 8.2–8.5 with 2N sodium hydroxide solution, at 0°–5°. After 2 hours, this second condensation stage has ended and a clear solution has formed.

The resulting dyestuff of the formula

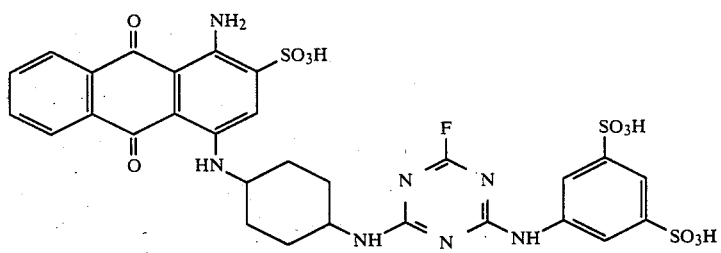

is salted out at 20° with 200 g of potassium chloride, filtered off and washed with 20% strength potassium chloride solution. After drying at 50° in vacuo, 31 g of dyestuff are obtained.

C. 50 g of a cotton hank are dyed in 1 liter of a dye liquor, which contains 1.5 g of the above dyestuff, by heating the mixture to 40° in the course of 30 minutes, adding 50 g of sodium chloride in several portions, then adding 20 g of sodium carbonate and treating the hank at this temperature for 60 minutes. After rinsing, soaping at the boil and drying, a very brilliant blue dyeing having excellent fastness to light and wet processing is obtained.

EXAMPLE 2

A. 24.0 g of 2-aminobenzene-1,4-disulphonic acid are dissolved in 200 ml of water at 0°–5° by adding about 65 ml of 2N sodium carbonate until the pH value reaches 4.5. 14.5 g of 2,4,6-trifluorotriazine are added dropwise to the solution in the course of 10 minutes and the pH value is kept at 4.2–4.5 with 2N sodium carbonate solution. The condensation reaction has ended 10 minutes after the dropwise addition and about 76 ml of 2N sodium carbonate solution have been consumed.

B. 28.3 g of 1-amino-4-(4'-aminocyclohexylamino)-anthraquinone-2-sulphonic acid are dissolved, with 45 ml of 4N sodium hydroxide solution, in 600 ml of water by warming to 65°. After cooling the solution to 0°–5°, the colouring matter is precipitated in a fine-particled form by lowering the pH value to 8.5–9.0 by means of 13 ml of concentrated hydrochloric acid and the solution of sodium 2-(2',4'-difluorotriazinylamino)-benzene-1,4-disulphonate prepared under A is now allowed to run in immediately in the course of about 20 minutes at 0°–5°. The pH value of the mixture is further kept at 8.2–8.5 by adding 2N sodium hydroxide solution dropwise. The condensation reaction is completed by subsequently stirring the mixture for 2 hours at 0°–5° and the dyestuff solution formed is then allowed to run into a mixture, warmed to 40°, of 300 ml of a saturated solution of potassium chloride and 300 g of potassium chloride. The dyestuff which has precipitated, which corresponds to the formula is filtered off and washed with 20% strength potassium chloride solution. After drying in vacuo at 50°, 72.5 g of a dyestuff are obtained which dyes cotton, by the process described in Example 1 C, in a very brilliant blue shade of good fastness to light and excellent fastness to wet processing.

C. The dyeing of cellulose materials can also be carried out in the following manner:

100 g of cotton fabric are padded at room temperature with an aqueous solution which contains 3% of the dyestuff, 15 g/liter of sodium bicarbonate and 150 g/liter of urea, intermediately dried, heated to 140° for 2 minutes and then rinsed and soaped at the boil. The fabric is dyed in exceptionally brilliant blue shades which are very fast to light and wet processing.

Instead of heating the fabric, which has been intermediately dried, to 140°, it is also possible to steam it at 105° for 2 minutes in order to obtain similar dyeings.

D. A further variant for dyeing cellulose materials consists in the following process:

100 g of cotton fabric are padded on a padder at room temperature with an aqueous solution which contains 30 g/liter of dyestuff and 20 g/liter of sodium carbonate so that the liquor pick-up of the fabric is 80% of its dry weight. The fabric is rolled up and stored for 24 hours at 25° C. in such a way that no moisture can escape. The fabric is then rinsed, soaped at the boil and dried. A blue dyeing which is very brilliant and fast to light and wet processing is likewise obtained.

EXAMPLE 3

A. 11.4 g of 4-aminobenzene-1,3-disulphonic acid are dissolved in 300 ml of water at a pH of 3.5. After cooling the solution to 0°–5°, 7.0 g of 2,4,6-trifluorotriazine are added dropwise in the course of 5 minutes and the pH value is kept at 3.5–4.0 by adding 1N disodium hydrogen phosphate solution. The condensation reaction has ended a few minutes after the components are brought together.

B. 13.4 g of 1-amino-4-(4'-aminocyclohexylamino)-anthraquinone-2-sulphonic acid are dissolved in 300 ml of water, and precipitated at 0°–5°, in the manner described in Example 1A. The above solution of 4-(2',4'-

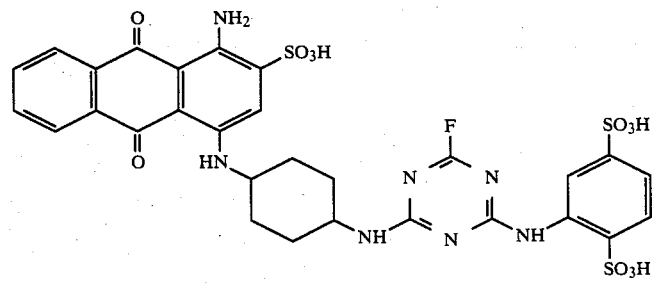

difluorotriazinylamino)-benzene-1,3-disulphonic acid, or the sodium salt thereof, is now allowed to run into the suspension in the course of 15 minutes whilst the temperature is further kept at 0°–5° and the pH value is kept at 7.7–8.2 by means of 2N sodium hydroxide solution. After the reaction has ended (checked by thin layer chromatography) the dyestuff solution is warmed to 20° and the dyestuff of the formula condensation product A is allowed to run into the suspension formed, at 20°, and the pH value is kept at 8.0–8.5 with 2N sodium hydroxide solution.

The mixture is subsequently stirred for about 2 hours, whilst maintaining the pH value, and the resulting dyestuff of the formula

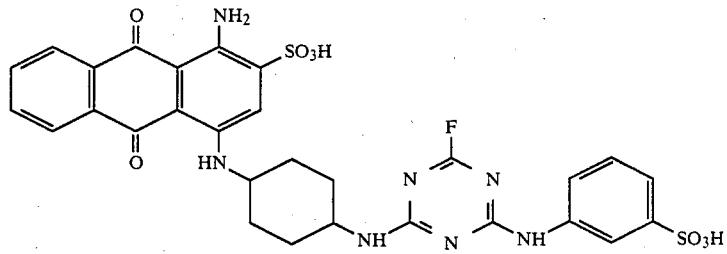

is then salted out by adding 140 g of potassium chloride. After filtering off, washing with 10% strength potassium chloride solution and drying at 50° in vacuo, 31 g of dyestuff are obtained which dyes cotton, by the process described in Example 1C, in very brilliant blue shades of excellent fastness to light and wet processing.

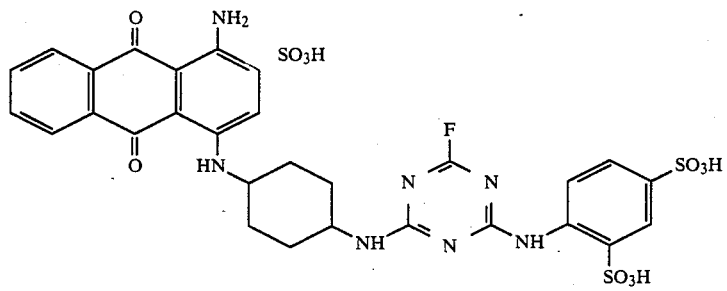

is salted out by adding 230 g of potassium chloride. It is filtered off and washed with 15% strength potassium chloride solution and, after drying at 50° in vacuo, 33 g of a blue powder are obtained.

C. Cellulose fabric is printed with a printing paste, which contains, per kilogram, 40 g of the above dyestuff, 100 g of urea, 300 ml of water and 500 g of alginate thickener as well as 20 g of sodium carbonate and which has been made up with water to 1 kilogram, dried, steamed for 1 minute at 105°, rinsed with hot water and then soaped at the boil, rinsed and dried. A brilliant blue print of very good fastness to wet processing and light is obtained in this manner.

EXAMPLE 4

A. 7.9 g of 3-aminobenzenesulphonic acid are dissolved in 300 parts of water at a pH of 4.0. 6.8 g of 2,4,6-trifluorotriazine are added dropwise at 0°–5° in the course of 5 minutes and the pH value is kept at 3.5 with 2N sodium carbonate solution. After subsequently stirring for 5–10 minutes, the condensation reaction has ended.

B. 13.4 g of 1-amino-4-(4'-aminocyclohexylamino)-anthraquinone-2-sulphonic acid are dissolved in 600 ml of water and 44 ml of 2N sodium hydroxide solution at 65°, the solution is cooled to 20° and the pH is adjusted to 8.5 with hydrochloric acid. The solution of the above

EXAMPLE 5

A. 6.9 g of 7-aminonaphthalene-1,3-disulphonic acid are dissolved in 150 ml of water with sodium carbonate at a pH of 3.5 and, after cooling the solution to 0°–5°, 3.5 g of 2,4,6-trifluorotriazine are added dropwise in the course of 5 minutes. At the same time, the pH value is kept at 3.2–3.5 with 1N sodium carbonate solution.

The reaction has ended 5 minutes after the dropwise addition of the cyanuric fluoride.

B. 6.7 g of 1-amino-4-(4'-aminocyclohexylamino)-anthraquinone-2-sulphonic acid are dissolved in 180 ml of water and 44 ml of 1N sodium hydroxide solution at 65°. The solution is cooled to 20° and the pH value is adjusted to 8.5 on hydrochloric acid.

The solution of the condensation product prepared under A is allowed to run into the suspension of the anthraquinone compound in the course of 10 minutes and the pH value of the reaction mixture is kept at 8.0–8.5 with 1N sodium hydroxide solution. After subsequently stirring for about two hours, the condensation reaction to give the reactive dyestuff has ended. The dyestuff of the formula

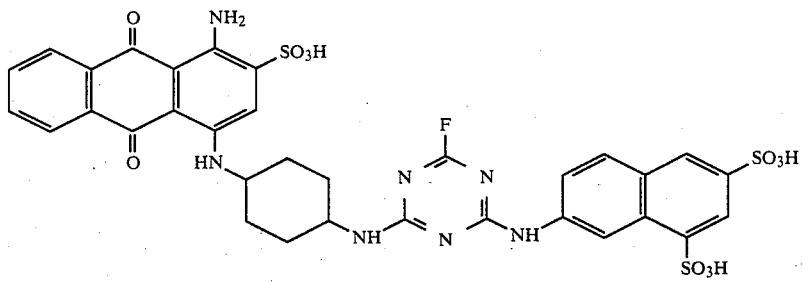

is salted out of the resulting solution with 80 g of sodium chloride and washed, after filtering off, with 15% strength sodium chloride solution and, after drying at 50° C. in vacuo, 18 g of a dyestuff are obtained which dyes cotton, by the dyeing process described in Example 2C, in very brilliant blue shades which are fast to wet processing.

EXAMPLE 6

If 8.7 g of 2-amino-toluene-4-sulphonic acid are used here instead of 7.9 g of 3-aminobenzenesulphonic acid in Example 4 and the procedure followed is otherwise as described there, 30.6 g of a salt-containing dyestuff are obtained of the formula

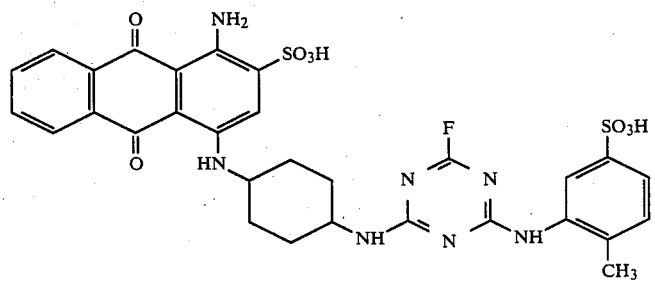

which is very similar to the dyestuff of Example 4 with respect to its coloristic properties.

EXAMPLE 7

A. 7.9 g of 2-aminobenzenesulphonic acid are subjected to a condensation reaction with 6.8 g of 2,4,6-trifluorotriazine in 200 ml of water at 0°–5° and at a pH of 3.5–4.0.

B. 13.4 g of hydroparabromic acid are dissolved in 300 ml of water with 44 ml of 2N sodium hydroxide solution at 65° and, after cooling the solution to 20°, are precipitated in a fine-particled form by lowering the pH value to 8.5. The difluorotriazinylaminobenzenesulphonic acid solution A is added to the suspension and the pH value is kept at 8.0–8.5 by means of 2N sodium hydroxide solution.

After about 2 hours, the reaction of the anthraquinone product with the reactive component has ended. The resulting dyestuff solution is now allowed to run into a mixture of 200 ml of a saturated solution of potassium chloride and 200 g of potassium chloride at 40°. The dyestuff which has precipitated is filtered off, washed with 15% strength potassium chloride solution and dried in vacuo at 50°. About 36 g of a salt-containing dyestuff are obtained which corresponds to the formula

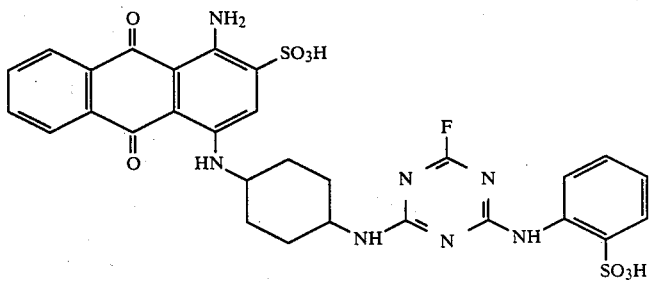

and dyes cotton, by the dyeing process described in Example 1C, in brilliant blue shades which are fast to light.

EXAMPLE 8

A. 9.2 g of 2-methylaminotoluene-4-sulphonic acid are dissolved in 150 ml of water at a pH of 3.5. 6.8 g of 2,4,6-trifluorotriazine are added dropwise to the solution in the course of 5 minutes and the pH value of the mixture is kept at 3.5 with 1N disodium hydrogen phosphate solution during this addition. The condensation reaction has ended 10 minutes later.

B. 13.4 g of 1-amino-4-(4'-aminocyclohexylamino)-anthraquinone-2-sulphonic acid are dissolved in 300 ml of water, and precipitated again in the fine-particled form at 0°–5°, in the manner described in Example 7.

The solution of the reactive component prepared under A is then allowed to run in in the course of 5 minutes and the pH value in the reaction mixture is kept at 8.0–8.3 with 1N sodium hydroxide solution. When the consumption of sodium hydroxide solution has virtually ceased (monitoring of the course of the reaction by thin layer chromatography), the resulting dyestuff solution is allowed to run into a mixture of 200 ml of a saturated solution of potassium chloride and 200 g of potassium chloride at 20° and the dyestuff suspension is subsequently stirred for 2 hours. After filtering off the product and washing the filter cake with 15% strength potassium chloride solution and drying the product at 40° in vacuo, about 29 g of salt-containing dyestuff are obtained, which corresponds to the formula

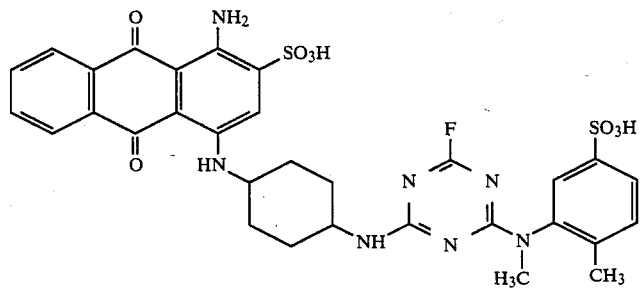

and dyes cotton by the dyeing techniques described above in very brilliant blue shades which are fast to light.

EXAMPLE 9

A. 8.7 g of 7-aminonaphthalene-1,3,6-trisulphonic acid are dissolved in 150 ml of water at a pH of 4.0 by means of sodium carbonate. The solution is cooled to 0°–5° and 3.3 g of 2,4,6-trifluorotriazine are added dropwise in the course of 5 minutes. The pH value is kept at 4.0–4.5 by simultaneously adding 1N sodium carbonate solution and the reaction is brought to completion in a few minutes by subsequently stirring briefly.

B. 6.7 g of 1-amino-4-(4'-aminocyclohexylamino)-anthraquinone-2-sulphonic acid are dissolved with 44 ml of 1N sodium hydroxide solution in 200 ml of water at 65°. The solution is cooled to 0°–5° and the anthraquinone compound is precipitated in the fine-particled form by adjusting the pH value to 8.5. The solution of difluorotriazinylaminonaphthalene-trisulphonic acid is then added dropwise to the dyestuff suspension in the course of 5–10 minutes and the pH value is kept at 8.2–8.5 with 1N sodium hydroxide solution. The temperature is now allowed to rise to 20° in the course of 2 hours, after which the condensation reaction has ended.

The pH value of the mixture is adjusted to 7.5 by means of hydrochloric acid. The resulting solution of the dyestuff of the formula

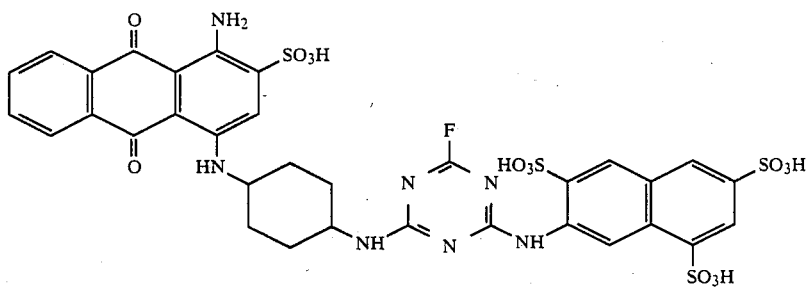

is added dropwise to 200 ml of a saturated solution of potassium chloride. 175 g of potassium chloride are added, at an equivalent rate to the dropwise addition, to the dyestuff suspension obtained. The dyestuff which has precipitated is filtered off, washed with 20% strength potassium chloride solution and dried at 50° in vacuo. About 16 g of a salt-containing dyestuff are obtained which gives brilliant prints, which are fast to wet processing, on cotton by the printing process of Example 3C.

EXAMPLE 10

A. 6.8 g of 3-aminonaphthalene-2,7-disulphonic acid are dissolved in 150 ml of water at a pH of 4.5 and the solution is cooled to 0°–5°. 3.4 g of 2,4,6-trifluorotriazine are added dropwise at this temperature in the course of 5 minutes and the pH value of the mixture is kept at 4.0–4.3 with 1N sodium carbonate solution. 10 minutes after the dropwise addition, the reaction has ended, which is indicated by the fact that the consumption of sodium carbonate ceases.

B. 6.7 g of 1-amino-4-(4'-aminocyclohexylamino)-anthraquinone-2-sulphonic acid are dissolved in 200 ml of water and 22 ml of 2N sodium hydroxide solution at 65°. The solution is cooled to 20°, 70 ml of acetone are added and the pH value is adjusted to 9.5 with hydrochloric acid. The solution of the above reactive component A is now added dropwise to the solution of the anthraquinone compound in the course of about 5 minutes and the pH value in the reaction mixture is kept at 8.0–8.5 by means of 1N sodium hydroxide solution. The reaction has ended after about 1 hour. After adding 300 ml of a saturated solution of potassium chloride dropwise, the resulting dyestuff of the formula

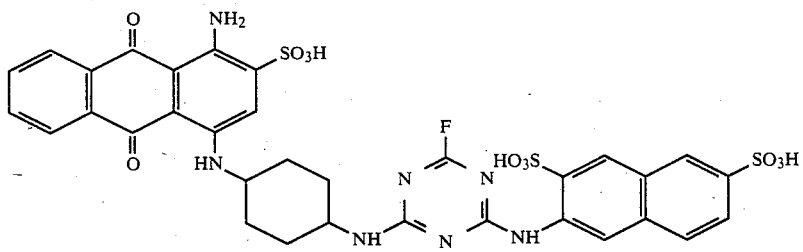

is filtered off and washed with 300 ml of 10% strength potassium chloride solution. After drying in vacuo at 50°, about 14.8 g of salt-containing dyestuff are obtained, which dyes cotton by the known dyeing processes in brilliant blue shades which are fast to wet processing and light.

EXAMPLE 11

A. 7.1 g of 1-amino-4-(4'-aminocyclohexylamino)-anthraquinone-2-sulphonic acid are dissolved in 120 ml of water and 10 ml of 4N sodium hydroxide solution at 70°. The solution is cooled, 120 ml of acetone are added at 20° and the temperature is now adjusted to 0°–5° and the pH value is adjusted to 7.5 by means of 7.5 ml of concentrated hydrochloric acid.

3.5 g of 2,4,6-trifluorotriazine are added dropwise to the solution of the anthraquinone component in the course of 5 minutes and the pH value of the solution is kept at 6.5–7.0 with 1N NaOH. The condensation reaction has ended 10 minutes after the dropwise addition.

B. A neutralised solution of 3.7 g of 3-amino-benzenesulphonic acid is now allowed to run into the solution of the intermediate product and the pH value of the mixture is further kept at 6.5–7.0. The temperature is allowed to rise to 20° in the course of 2 hours and the mixture is then heated to 40° for a further 4 hours, whilst maintaining the above pH value. 350 ml of a saturated solution of potassium chloride are now added to the dyestuff solution and the dyestuff which has precipitated is filtered off and washed with 15% strength potassium chloride solution. After drying at 40° in vacuo, a product is obtained which contains the dyestuff of the formula

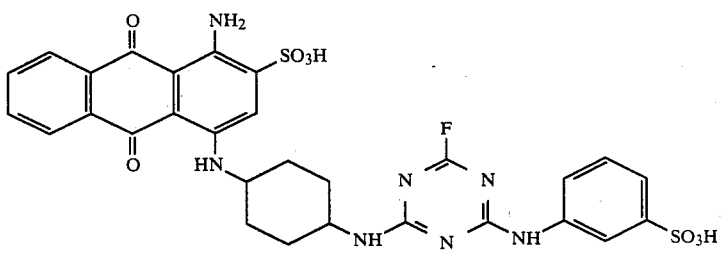

and which dyes cellulose fibres by the dyeing processes described above in brilliant blue shades.

C. A similar dyestuff is obtained if 13.4 g of 1-amino-4-(2'-amino-cyclohexylamino)-anthraquinone-2-sulphonic acid are used instead of the 4'-amino compound given under A.

EXAMPLE 12

A. 9.6 g of 2-amino-5-sulphobenzoic acid are dissolved in 200 ml of water at a pH of 5. By adding 6.8 g of cyanuric fluoride dropwise at 0°–5° and maintaining the pH value at 4.4–4.6 with 2N sodium carbonate solution, a condensation reaction is carried out to give difluorotriazinylamino-sulphobenzoic acid, which can be further reacted.

B. 13.4 g of 1-amino-4-(4'-aminocyclohexylamino)-anthraquinone-2-sulphonic acid are dissolved in 300 ml of water and 44 ml of 2N sodium hydroxide solution at 65° and reprecipitated in the fine-particled form by cooling the solution to 0°–5° and adjusting the pH value to 8.5. The solution of the reactive component, prepared under A., is now added dropwise at 0°–5° in the course of 10 minutes and the pH value of the mixture is kept at 8.2–8.5 with 2N sodium hydroxide solution. After subsequently stirring for about two hours, whilst maintaining the above pH value, the reaction has ended. By subsequently adjusting the pH value of the mixture to 6.0 and salting out the product with 200 g of potassium chloride, filtering off and drying in vacuo, a dyestuff is obtained which corresponds to the formula

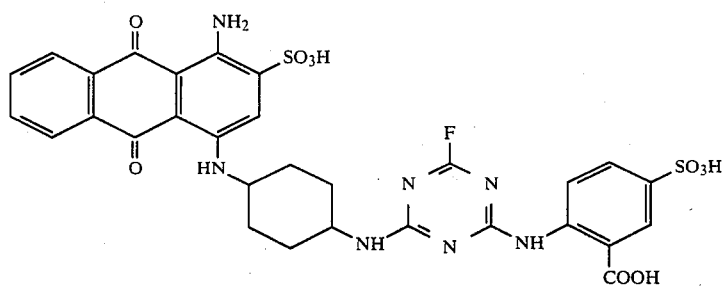

and which dyes cotton by the dyeing processes mentioned above in very brilliant blue shades.

Further brilliant blue reactive dyestuffs of the general formula

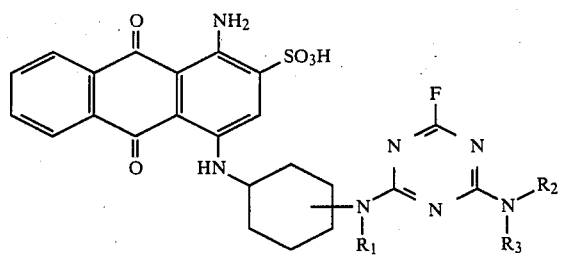

$R_1$ = H or lower alkyl,
$R_2$ = H or lower, optionally substituted alkyl and
$R_3$ = an aromatic radical which optionally contains a group which confers solubility in water, are obtained in a completely analogous manner if the water-soluble aromatic amino compounds $R_2$—NH—$R_3$ listed in the Table I which follows (left-hand column) are subjected to a condensation reaction with 2,4,6-trifluorotriazine and the resulting reactive intermediate products are reacted with the aminocyclohexylaminoanthraquinone components in the right-hand column of Table I.

TABLE I

| Example No. | $R_2$—NH—$R_3$ | Anthraquinone component |
|---|---|---|
| 13 | 4-Aminobenzene-1,2-disulphonic acid | 1-Amino-4-(4'-aminocyclohexylamino)-anthraquinone-2-sulphonic acid |
| 14 | 4-amino-5-methylbenzene-1,2-disulphonic acid | 1-Amino-4-(4'-aminocyclohexylamino)-anthraquinone-2-sulphonic acid |
| 15 | 4-amino-5-methylbenzene-1,3-disulphonic acid | 1-Amino-4-(4'-aminocyclohexylamino)-anthraquinone-2-sulphonic acid |
| 16 | 2-amino-3,5-dimethylbenzenesulphonic acid | 1-Amino-4-(4'-aminocyclohexylamino)-anthraquinone-2-sulphonic acid |
| 17 | 3-amino-2,4-dimethylbenzenesulphonic acid | 1-Amino-4-(4'-aminocyclohexylamino)-anthraquinone-2-sulphonic acid |
| 18 | 3-amino-4-chlorobenzenesulphonic acid | 1-Amino-4-(4'-aminocyclohexylamino)-anthraquinone-2-sulphonic acid |
| 19 | 2-amino-4-chloro-3-methylbenzenesulphonic acid | 1-Amino-4-(4'-aminocyclohexylamino)-anthraquinone-2-sulphonic acid |
| 20 | 4-amino-3-chlorobenzenesulphonic acid | 1-Amino-4-(4'-aminocyclohexylamino)-anthraquinone-2-sulphonic acid |
| 21 | 2-amino-5-methylbenzenesulphonic acid | 1-Amino-4-(4'-aminocyclohexylamino)-anthraquinone-2-sulphonic acid |
| 22 | 4-amino-3-methylbenzenesulphonic acid | 1-Amino-4-(4'-aminocyclohexylamino)-anthraquinone-2-sulphonic acid |
| 23 | 3-ethylamino-4-methylbenzenesulphonic acid | 1-Amino-4-(4'-aminocyclohexylamino)-anthraquinone-2-sulphonic acid |
| 24 | 5-amino-2-methoxybenzenesulphonic acid | 1-amino-4-(4'-aminocyclohexylamino)-anthraquinone-2-sulphonic acid |
| 25 | 2-amino-5-methoxybenzenesulphonic acid | 1-amino-4-(4'-aminocyclohexylamino)-anthraquinone-2-sulphonic acid |
| 26 | 3-amino-4-methoxybenzenesulphonic acid | 1-amino-4-(4'-aminocyclohexylamino)-anthraquinone-2-sulphonic acid |
| 27 | 3-amino-4-(β-hydroxyethoxy)-benzenesulphonic acid | 1-amino-4-(4'-aminocyclohexylamino)-anthraquinone-2-sulphonic acid |
| 28 | 5-amino-2-(β-hydroxyethoxy)-benzenesulphonic acid | 1-amino-4-(4'-aminocyclohexylamino)-anthraquinone-2-sulphonic acid |
| 29 | 5-aminonaphthalene-1,3-disulphonic acid | 1-amino-4-(4'-aminocyclohexylamino)-anthraquinone-2-sulphonic acid |
| 30 | 8-aminonaphthalene-1,3-disulphonic acid | 1-amino-4-(4'-aminocyclohexylamino)-anthraquinone-2-sulphonic acid |
| 31 | 6-aminonaphthalene-1,3-disulphonic acid | 1-amino-4-(4'-aminocyclohexylamino)-anthraquinone-2-sulphonic acid |
| 32 | 3-aminonaphthalene-1,5-disulphonic acid | 1-amino-4-(4'-aminocyclohexylamino)-anthraquinone-2-sulphonic acid |
| 33 | 2-aminonaphthalene-1,5-disulphonic acid | 1-amino-4-(4'-aminocyclohexylamino)-anthrasulphonic-2-sulphonic acid |
| 34 | 4-aminonaphthalene-1,5-disulphonic acid | 1-amino-4-(4'-aminocyclohexylamino)-anthraquinone-2-sulphonic acid |

TABLE I-continued

| Example No. | R$_2$—NH—R$_3$ | Anthraquinone component |
|---|---|---|
| 35 | 8-aminonaphthalene-1,6-disulphonic acid | 1-amino-4-(4'-aminocyclohexylamino)-anthraquinone-2-sulphonic acid |
| 36 | 4-aminonaphthalene-2,6-disulphonic acid | 1-amino-4-(4'-aminocyclohexylamino)-anthraquinone-2-sulphonic acid |
| 37 | 1-aminonaphthalene-3,6-disulphonic acid | 1-amino-4-(4'-aminocyclohexylamino)-anthraquinone-2-sulphonic acid |
| 38 | 4-aminonaphthalene-1,3-disulphonic acid | 1-amino-4-(4'-aminocyclohexylamino)-anthraquinone-2-sulphonic acid |
| 39 | 6-aminonaphthalene-1,3,5-trisulphonic acid | 1-amino-4-(4'-aminocyclohexylamino)-anthraquinone-2-sulphonic acid |
| 40 | 5-aminonaphthalene-1,3,7-trisulphonic acid | 1-amino-4-(4'-aminocyclohexylamino)-anthraquinone-2-sulphonic acid |
| 41 | 2-aminobenzoic acid | 1-amino-4-(4'-aminocyclohexylamino)-anthraquinone-2-sulphonic acid |
| 42 | 3-amino-5-sulphobenzoic acid | 1-amino-4-(4'-aminocyclohexylamino)-anthraquinone-2-sulphonic acid |
| 43 | 2-amino-4-sulphobenzoic acid | 1-amino-4-(4'-aminocyclohexylamino)-anthraquinone-2-sulphonic acid |
| 44 | 2-methylaminobenzoic acid | 1-amino-4-(4'-aminocyclohexylamino)-anthraquinone-2-sulphonic acid |
| 45 | 3-aminophenylmethanesulphonic acid | 1-amino-4-(4'-aminocyclohexylamino)-anthraquinone-2-sulphonic acid |
| 46 | N—phenylaminomethanesulphonic acid | 1-amino-4-(4'-aminocyclohexylamino)-anthraquinone-2-sulphonic acid |
| 47 | 4-aminophenylmethanesulphonic acid | 1-amino-4-(4'-aminocyclohexylamino)-anthraquinone-2-sulphonic acid |
| 48 | 2-methylamino-4-sulphobenzoic acid | 1-amino-4-(4'-aminocyclohexylamino)-anthraquinone-2-sulphonic acid |
| 49 | 5-aminobenzene-1,3-disulphonic acid | 1-amino-4-(3'-aminocyclohexylamino)-anthraquinone-2-sulphonic acid |
| 50 | 2-aminobenzene-1,4-disulphonic acid | 1-amino-4-(3'-aminocyclohexylamino)-anthraquinone-2-sulphonic acid |
| 51 | 5-aminobenzene-1, disulphonic acid | 1-amino-4-[4'-($\beta$-hydroxyethylamino)-cyclohexylamino]-anthraquinone-2-sulphonic acid |
| 52 | 2-aminobenzenesulphonic acid | 1-amino-4-[4'-($\beta$-hydroxyethylamino)-cyclohexylamino]-anthraquinone-2-sulphonic acid |
| 53 | 2-aminobenzene-1,4-disulphonic acid | 1-amino-4-[4'-($\beta$-hydroxyethylamino)-cyclohexylamino]-anthraquinone-2-sulphonic acid |
| 54 | 3-aminobenzenesulphonic acid | 1-amino-4-[4'-($\beta$-hydrogenosulphato-ethylamino)-cyclohexylamino]-anthraquinone-2-sulphonic acid |
| 55 | 4-aminobenzenesulphonic acid | 1-amino-4-[4'-($\beta$-hydrogenosulphato-ethylamino)-cyclohexylamino]-anthraquinone-2-sulphonic acid |
| 56 | 2-aminobenzenesulphonic acid | 1-amino-4-[4'-($\beta$-hydrogenosulphato-ethylamino)-cyclohexylamino]-anthraquinone-2-sulphonic acid |
| 57 | 4-aminobenzene-1,3-disulphonic acid | 1-amino-4-(3'-aminocyclohexylamino)-anthraquinone-2-sulphonic acid |
| 58 | 3-methylaminobenzenesulphonic acid | 1-amino-4-(3'-aminocyclohexylamino)-anthraquinone-2-sulphonic acid |
| 59 | 4-methylaminobenzenesulphonic acid | 1-amino-4-(3'-aminocyclohexylamino)-anthraquinone-2-sulphonic acid |
| 60 | 3-aminobenzenesulphonic acid | 1-amino-4-[4'-($\beta$-hydroxy-$\gamma$-sulpho-propylamino)-cyclohexylamino]-anthraquinone-2-sulphonic acid |
| 61 | 2-aminobenzenesulphonic acid | 1-amino-4-[4'-($\beta$-hydroxy-$\gamma$-sulpho-propylamino)-cyclohexylamino]-anthraquinone-2-sulphonic acid |
| 62 | 2-aminobenzene-1,4-disulphonic acid | 1-amino-4-[4'-($\beta$-hydroxy-$\gamma$-sulpho-propylamino)-cyclohexylamino]-anthraquinone-2-sulphonic acid |
| 63 | 2-methylaminotoluene-4-sulphonic acid | 1-amino-4-[4'-($\beta$-hydroxy-$\gamma$-sulpho-propylamino)-cyclohexylamino]-anthraquinone-2-sulphonic acid |

EXAMPLE 64

A. 5.3 g of 2,4,6-trichlorotriazine are dissolved in 50 ml of acetone and precipitated as a suspension by introducing 50 g of ice. A neutralised solution of 7.2 g of 2-aminobenzene-1,4-disulphonic acid in 70 ml of water is added dropwise and the pH value of the mixture is kept at 4.5–5.0 at 0°–5° with 2N sodium carbonate solution. The condensation reaction has ended after about 15 ml of 2N sodium carbonate solution have been consumed.

B. 9.4 g of 1-amino-4-(4'-aminocyclohexylamino)-anthraquinone-2-sulphonic acid are dissolved in 270 ml of water and 13.3 ml of 4N sodium hydroxide solution at 65°. The solution is cooled to 20° and the colouring matter is precipitated in the fine-particled form by lowering the pH value to 8.5. The solution of sodium 2-(2',4'-dichlorotriazinylamino)benzene-1,4-disulphonate prepared under A is added dropwise to the suspension in the course of 10 minutes and the pH value of the mixture is kept at 8.5–8.8 with 1N sodium hydroxide solution. After adding the reactive component, the temperature is raised to 35° and the condensation reaction is brought to completion at the above pH value. The dyestuff solution formed is allowed to run into a mixture of 200 ml of a saturated solution of potassium chloride and 110 g of potassium chloride at 40°–45°, the mixture is subsequently stirred for some time and the dyestuff which has precipitated is filtered off, washed with 20% strength potassium chloride solution and dried at 50° in vacuo. About 25 g of a salt-containing dyestuff of the formula sodium carbonate solution. After about 3 hours, the condensation reaction has ended and the consumption of sodium carbonate has ceased after about 30 ml of 2N sodium carbonate solution have been taken up.

B. 15.0 g of 1-amino-4-(4'-aminocyclohexylamino)-anthraquinone-2-sulphonic acid are dissolved in 200 ml of water and 13.3 ml of 4N sodium hydroxide solution at 65°. The solution is then cooled to 35°, 150 ml of acetone are added and the pH value is adjusted to 9.0 with hydrochloric acid. The solution of the sodium salt of 4-(2',4'-dichloro-triazinylamino)benzene-1,3-disulphonic acid, prepared under A., is now added to the solution and the pH value of the mixture is kept at 8.0–8.5 with 2N sodium hydroxide solution. The condensation reaction is brought to completion by subsequently stirring for 3 hours at 35°. The solution is con-

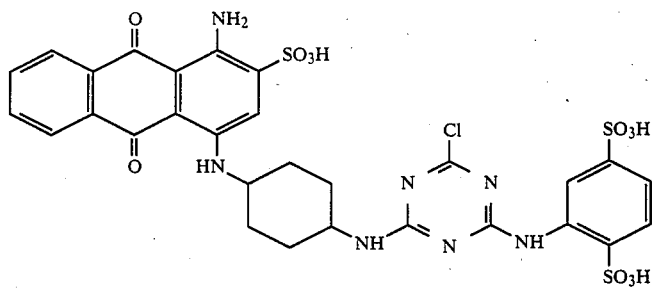

are obtained, which gives brilliant blue prints on cotton, by the process indicated in Example 3C, which are very centrated to 350 ml in vacuo at 35°–40°, and finally under 12 mm Hg. The dyestuff of the formula

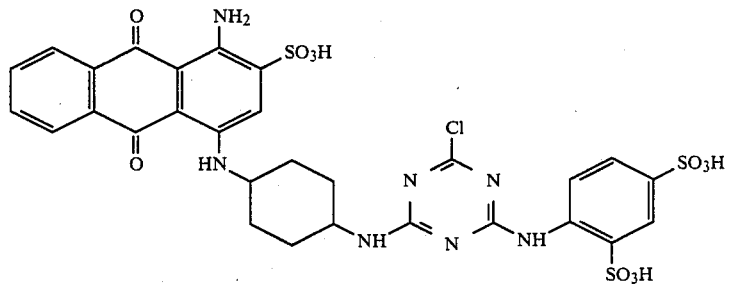

fast to light and have excellent fastness to wet processing.

A similar dyestuff is obtained, if, instead of 5.3 g of cyanuric chloride, 9.1 g of 2,4,6-tribromotriazine are subjected to a condensation reaction with 2-aminobenzene-1,4-disulphonic acid and the resulting reactive component is reacted with 1-amino-4-(4'-aminocyclohexylamino)-anthraquinone-2-sulphonic acid.

EXAMPLE 65

A. 8.3 g of 2,4,6-trichlorotriazine are dissolved in 85 ml of acetone and precipitated as a suspension by introducing 85 g of ice. A solution of 11.4 g of 4-amino-benzene-1,3-disulphonic acid, in the form of the sodium salt, in 160 ml of water is allowed to run in at 0°–5° and the pH value of the mixture is kept at 4.5–5.5 with 2N is salted out of the solution with 100 g of potassium chloride at 35°, filtered off and washed with 20% strength potassium chloride solution. About 31 g of dyestuff are obtained which dyes cotton by the pad-steam process or pad-thermofixing process described in paragraph 2C in clear blue shades which are very fast to light and wet processing.

Further reactive dyestuffs which dye in brilliant blue shades are obtained in a manner analogous to Examples 64 and 65 if 2,4,6-trichlorotriazine is subjected to a condensation reaction with the water-soluble aromatic amines $R_2$—NH—$R_3$ in the left-hand column of Table II and the resulting dichlorotriazinylamino reactive components are reacted with the aminocyclohexylamino-anthraquinone components listed in the right-hand column of Table II.

TABLE II

| Example No. | $R_2$—NH—$R_3$ | Anthraquinone component |
|---|---|---|
| 66 | 4-Amino-5-methylbenzene-1,2-disulphonic acid | 1-amino-4-(4'-aminocyclohexylamino)-anthraquinone-2-sulphonic acid |
| 67 | 5-aminobenzene-1,3-disulfonic acid | 1-Amino-4-(4'-aminocyclohexylamino)-anthraquinone-2-sulphonic acid |
| 68 | 4-aminobenzene-1,2-disulphonic acid | 1-Amino-4-(4'-aminocyclohexylamino)- |

TABLE II-continued

| Example No. | R₂—NH—R₃ | Anthraquinone component |
|---|---|---|
|  |  | anthraquinone-2-sulphonic acid |
| 69 | 2-amino-5-sulphobenzoic acid | 1-Amino-4-(4'-aminocyclohexylamino)-anthraquinone-2-sulphonic acid |
| 70 | 7-aminonaphthalene-1,3-disulphonic acid | 1-Amino-4-(4'-aminocyclohexylamino)-anthraquinone-2-sulphonic acid |
| 71 | 2-methylaminotoluene-4-sulphonic acid | 1-Amino-4-(4'-aminocyclohexylamino)-anthraquinone-2-sulphonic acid |
| 72 | 2-aminobenzene-sulphonic acid | 1-Amino-4-(4'-aminocyclohexylamino)-anthraquinone-2-sulphonic acid |
| 73 | 2-amino-5-methoxybenzenesulphonic acid | 1-Amino-4-(4'-aminocyclohexylamino)-anthraquinone-2-sulphonic acid |
| 74 | N—phenylaminomethanesulphonic acid | 1-Amino-4-(4'-aminocyclohexylamino)-anthraquinone-2-sulphonic acid |
| 75 | 2-aminobenzene-1,4-disulphonic acid | 1-amino-4-(3'-aminocyclohexylamino)-anthraquinone-2-sulphonic acid |
| 76 | 2-aminobenzene-sulphonic acid | 1-amino-4-[4'-(β-hydroxy-γ-sulphopropyl-amino)-cyclohexylamino]-anthraquinone-2-sulphonic acid |
| 77 | 2-aminobenzoic acid | 1-amino-4-[4'-(β-hydroxy-γ-sulphopropyl-amino)-cyclohexylamino]-anthraquinone-2-sulphonic acid |
| 78 | 4-amino-benzene-1,3-disulphonic acid | 1-amino-4-[4'-(β-hydroxy-γ-sulphopropyl-amino)-cyclohexylamino]-anthraquinone-2-sulphonic acid |
| 79 | 3-aminonaphthalene-2,7-disulphonic acid | 1-amino-4-[4'-(β-hydroxy-γ-sulphopropyl-amino)-cyclohexylamino]-anthraquinone-2-sulphonic acid |
| 80 | 6-aminotoluene-3-sulphonic acid | 1-amino-4-[4'-(β-hydroxy-γ-sulphopropyl-amino)-cyclohexylamino]-anthraquinone-2-sulphonic acid |
| 81 | 4-aminophenylmethane-sulphonic acid | 1-amino-4-[4'-(β-hydroxy-γ-sulphopropyl-amino)-cyclohexylamino]-anthraquinone-2-sulphonic acid |

EXAMPLE 82

A. 8.3 g of 2,4,6-trichlorotriazine are dissolved in 85 ml of acetone and precipitated as a suspension by introducing 85 g of ice. A neutralised solution of 3.9 g of 3-aminobenzenesulphonic acid and 3.9 g of 4-aminobenzenesulphonic acid in 150 ml of water is now added dropwise to the cyanuric chloride suspension at 0°–5° and the pH value of the mixture is kept at 4.5–5.0 with 2N sodium carbonate solution until the cyanuric chloride has reacted.

B. 15.0 g of 1-amino-4-(4'-aminocyclohexylamino)-anthraquinone-2-sulphonic acid are dissolved in 200 ml of water and 13.3 ml of 4N sodium hydroxide solution at 65°. The solution is cooled to 35°, 150 ml of acetone are added and the pH value is adjusted to 9.0 with hydrochloric acid. The solution of the condensation product prepared under A is now added dropwise to the solution of the anthraquinone component and the pH value of the mixture is kept at 8.0–8.5 with 1N sodium hydroxide solution. The mixture is subsequently stirred for a further 3 hours at 35°–40° until the condensation reaction has ended and the resulting dyestuff solution is then allowed to run into an equal volume of a saturated solution of potassium chloride.

The dyestuff mixture which has precipitated, which contains the dyestuffs of the formulae

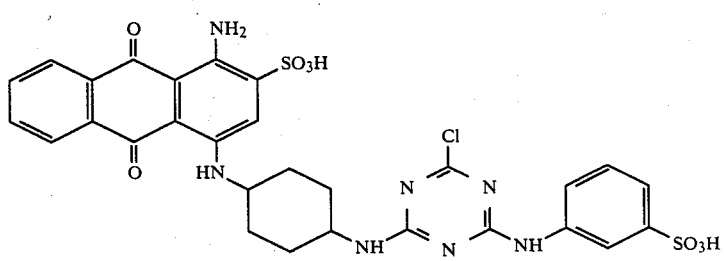

and

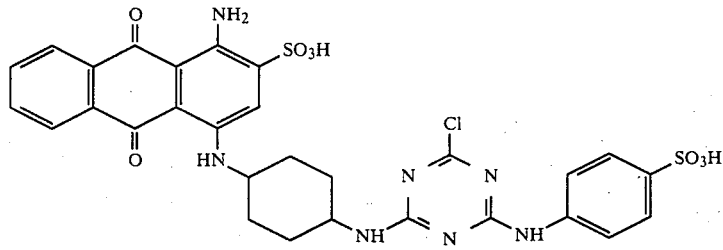

in the ratio 1:1, is filtered off, washed with 10% strength potassium chloride solution and dried at 50° in vacuo.

About 33 g of a product are obtained which gives brilliant, blue prints on cotton, by the printing process indicated in Example 3C, which are very fast to light and wet processing.

We claim:

1. A dyestuff of the formula

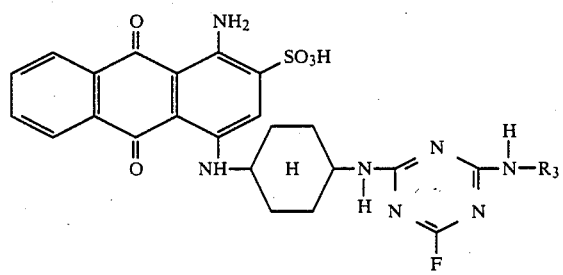

wherein
R$_3$=phenyl substituted with sulpho.

2. A dyestuff of the formula

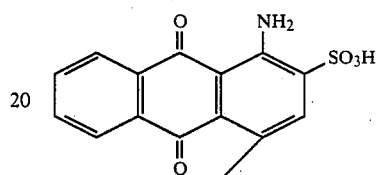
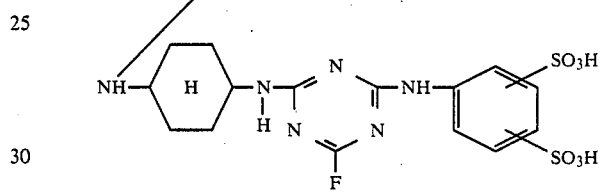

3. A dyestuff of claim 1 having the formula

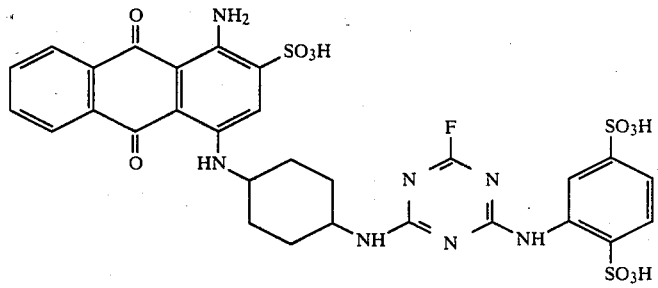

* * * * *

UNITED STATES PATENT AND TRADEMARK OFFICE
CERTIFICATE OF CORRECTION

PATENT NO. : 4,837,320

DATED : June 6, 1989

INVENTOR(S) : Harms et al

It is certified that error appears in the above-identified patent and that said Letters Patent is hereby corrected as shown below:

| | |
|---|---|
| Title Page | US PATENT DOCUMENTS: After " 3,408,345, 10/1968, " delete " Birnet al. " and substitute -- Bien et al. III --; After " 3,558,620, 1/1971, Bien et al. " add -- I -- After " 3,558,621, 1/1971, Bien et al. " add -- II --. |
| Col. 10, line 41 | After " to " add -- light -- |
| Col. 10, line 55 | Delete " light " |
| Col. 16, Example 33 | Under Anthraquinone component : Delete " anthrasulphonic " and substitute -- anthraquinone -- |
| Col. 17, Example 51 | Under $R_2$-NH-$R_3$: After " aminobenzene- " delete " 1. " and substitute -- 1,3 -- |
| Col. 20, Example 67 | Under $R_2$-NH-$R_3$: After " 1,3 " delete " disulfonic " and substitute -- disulphonic -- |
| Col. 21, Example 79 | Under $R_2$-NH-$R_3$: After " 3 " delete " aminoaphthaler " and substitute -- aminonaphthalene -- |

UNITED STATES PATENT AND TRADEMARK OFFICE
CERTIFICATE OF CORRECTION

PATENT NO. : 4,837,320

DATED : June 6, 1989

INVENTOR(S) : Harms et al

It is certified that error appears in the above-identified patent and that said Letters Patent is hereby corrected as shown below:

Col. 23, claim 1 Formula — Delete "NH–⟨H⟩–N(H)" and sub --NH–⟨ ⟩–NH--

Col. 24, claim 2 — Delete "NH–⟨H⟩–N(H)" and sub --NH–⟨ ⟩–NH--

Signed and Sealed this

Seventh Day of January, 1992

Attest:

HARRY F. MANBECK, JR.

*Attesting Officer*      *Commissioner of Patents and Trademarks*